J. Haskins,
Shoe Uppers,
N° 82,944. Patented Oct. 13, 1868

Witnesses
J. E. Carpenter
C. D. Wright

Inventor
John Haskins

JOHN HASKINS, OF BOSTON, MASSACHUSETTS.

Letters Patent No. 82,944, dated October 13, 1868.

IMPROVED ELASTIC GORING FOR BOOTS AND SHOES.

The Schedule referred to in these Letters Patent and making part of the same.

*To all whom it may concern:*

Be it known that I, JOHN HASKINS, of Boston, in the county of Suffolk, and State of Massachusetts, have invented certain new and useful Improvements in Elastic Goring for Boots and Shoes; and do hereby declare that the following is a full, clear, and exact description thereof, reference being had to the accompanying drawings, making part of this specification.

The object of my invention is to overcome the objections existing to the common rubber gorings for boots and shoes.

In using the common gorings, the elasticity is lost after a little wear, and the goring becomes useless, and even when the elasticity holds, the worn part will often break, and thus destroy the usefulness of the goring. The general lack of durability of the common article used for this purpose is a source of great loss and inutility.

It has been the subject of study for many years to produce a goring which will overcome these great objections, and I claim to have produced the required invention.

Letters Patent, granted me for improvements in rubber fabrics, July 30, 1867, No. 67,298, virtually give me the right to use the article which is the principle of this application, but there is needed further invention to its adaptation to gorings for boots and shoes, and therefore I desire Letters Patent for the invention which secures this adaptation.

In the use of the common gorings, there is an oil, which comes from some kinds of leather used, which penetrates the goring and rots it, thereby causing it to break quicker than it would ordinarily. I seek, also, in constructing my new goring, to overcome this objection.

My invention consists in using perforated rubber sheets, the subject of Letters Patent referred to above, No. 67,298, without being woven, corrugated, or shirred, with lateral stays protected by a varnish, to prevent rotting from the influence of oil.

In the drawings annexed,

Figure 1:
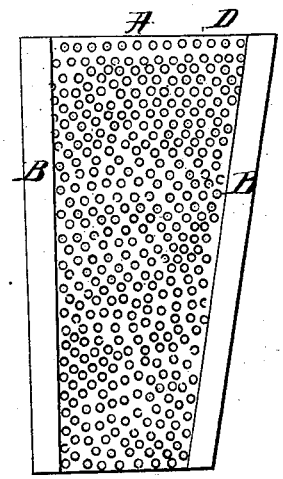
Figure 1 is a plan view of the goring, showing the stays.
Figure 2:
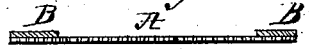
Figure 2 is a sectional view.

A is the body of the goring, made of perforated rubber sheets. B B are stays of cloth, to enable the goring to be more readily fastened to the boot or shoe, and also to prevent the stitches through the rubber from tearing out. These stays, as well as the rubber to which they are attached, are protected by being saturated by any elastic varnish that will resist oil, to prevent the oil which is used in dressing some kinds of leather from penetrating the rubber or the stays, and thereby rotting them.

What I claim, therefore, as my invention, and desire to secure by Letters Patent, is—

As a new article of manufacture, a goring for boots and shoes, made of perforated rubber sheets, with stays B B, saturated with an elastic varnish, as and for the purposes described and specified.

In testimony whereof, I have signed my name to this specification in the presence of two subscribing witnesses.

JOHN HASKINS.

Witnesses:
J. E. CARPENTER,
C. D. WRIGHT.